July 21, 1931. H. A. DOUGLAS 1,815,871
COMBINED STEERING AND LIGHTING MECHANISM FOR VEHICLES
Filed Feb. 9, 1927 2 Sheets-Sheet 1
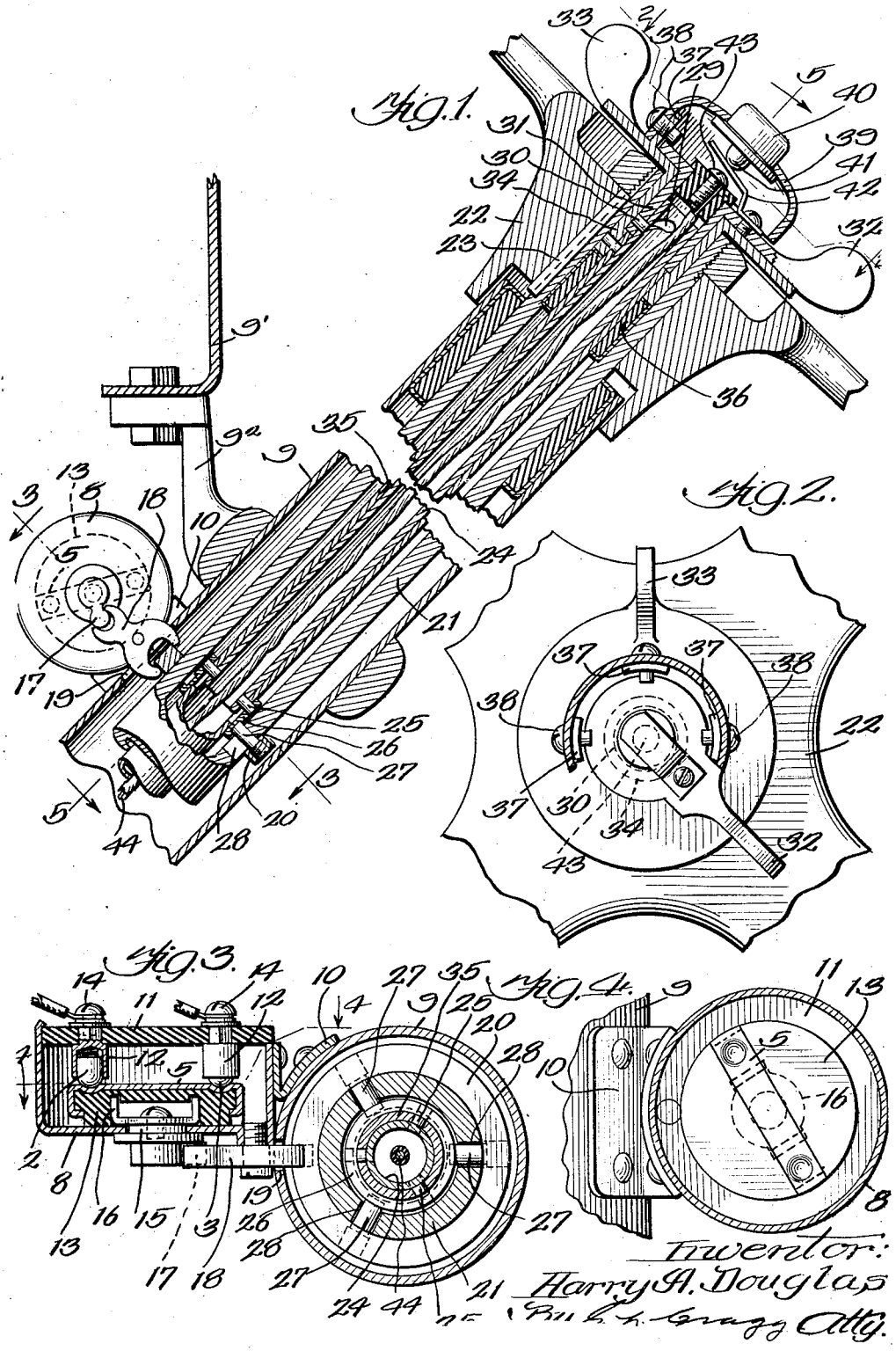

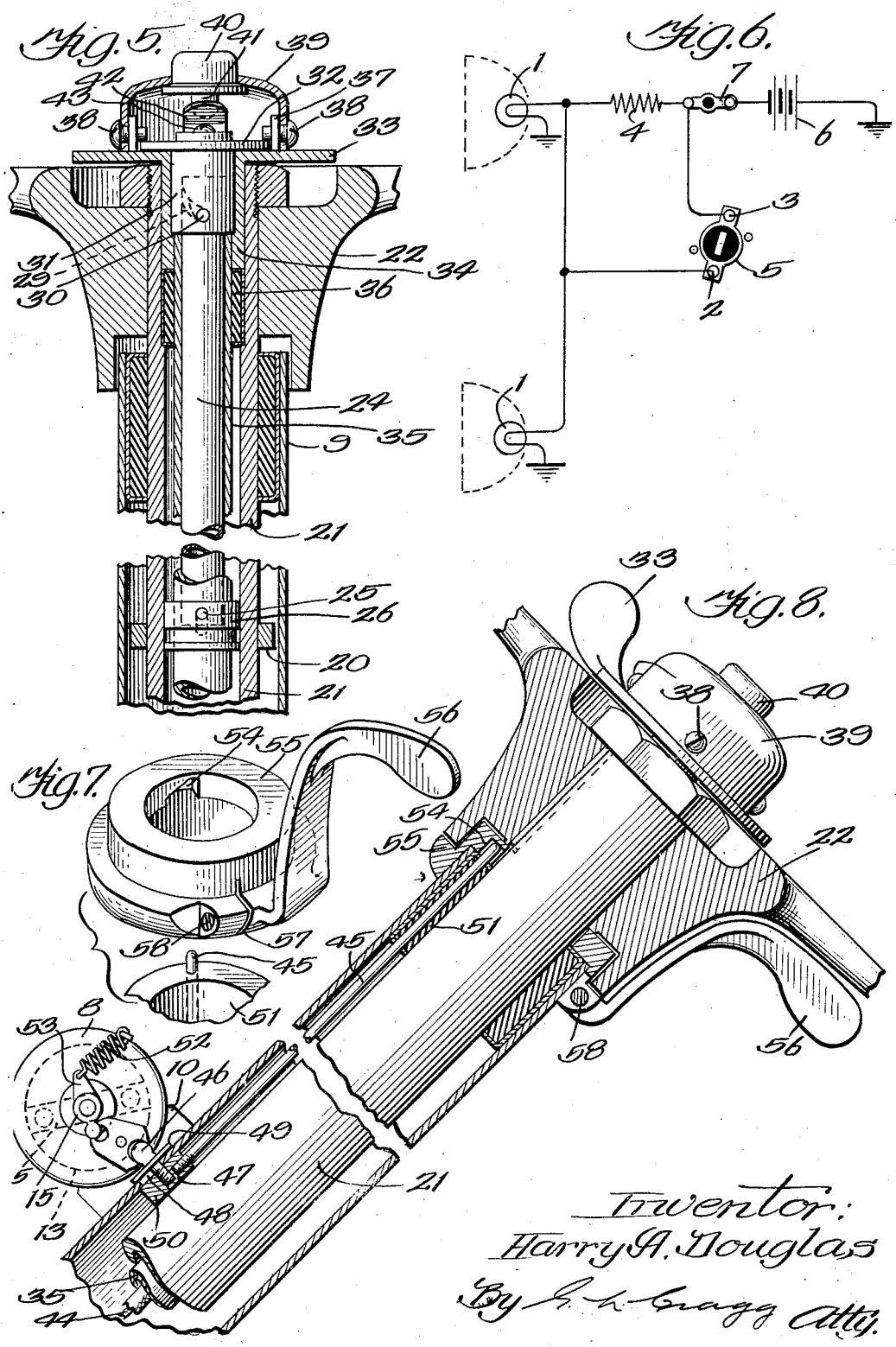

Patented July 21, 1931

1,815,871

UNITED STATES PATENT OFFICE

HARRY A. DOUGLAS, OF BRONSON, MICHIGAN

COMBINED STEERING AND LIGHTING MECHANISM FOR VEHICLES

Application filed February 9, 1927. Serial No. 166,930.

My invention relates to vehicles employing steering shafts and steering wheels upon the shafts. It has for its object the provision of improved controlling mechanism operable at such a steering wheel and in actuating relation to light controlling or other electric switching mechanism which is remote from the steering wheel.

In carrying out my invention, I employ a lever mounted to turn at the steering wheel and in controlling relation to a switch operating rod that extends to the switching mechanism. The lever is desirably provided with a cam formation which couples it with the rod and which is constructed to enable longitudinal movement of the rod in opposite directions, as the lever is moved in opposite directions, to place the switching mechanism in alternative adjustments. It is customary to place the steering shafts within stationary steering columns, the rod of my improved structure being also contained in such a column while the switching mechanism is preferably secured in a fixed location by attachment to the column on the exterior thereof.

The invention will be more fully explained in connection with the accompanying drawings in which Fig. 1 is a longitudinal sectional view with parts broken away, illustrating a stationary steering column coupled with an instrument board of an automobile and enclosing various controlling elements inclusive of the rod element of my invention, there being also illustrated a switching mechanism secured upon the exterior of the column, a portion of the steering wheel, levers upon the steering wheel, and a horn button; Fig. 2 is a sectional view on line 2—2 of Fig. 1; Fig. 3 is a sectional view on line 3—3 of Fig. 1; Fig. 4 is a sectional view on line 4—4 of Fig. 3; Fig. 5 is a sectional view on line 5—5 of Fig. 1; Fig. 6 is a diagram of one circuit arrangement; Fig. 7 is a perspective view illustrating, in separated relation, cooperating elements that enter into another form of the invention; and Fig. 8 is a longitudinal sectional view illustrating the adaptation of the structure shown in Fig. 7 to a steering column and switching mechanism mounted upon the exterior of said column.

The circuit illustrated in Fig. 6 is inclusive of two head lamps 1 each having one terminal grounded and its other terminal connected by a low resistence path with a switch contact 2 and by another path with a switch contact 3, the latter path including a dimming resistence 4. A switch bar 5, preferably formed as illustrated in Figs. 3 and 4, is mounted to turn and serves, in one position, to connect the contacts 2 and 3 and, in an alternative position, to disconnect these contacts. When the contacts 2 and 3 are connected, the dimming resistence 4 is shunted, current then being supplied from the grounded battery 6 through the master switch 7 to the head lamps by way of the switch elements 2, 3 and 5 and as the resistence in the path then flowing from the battery is low, the head lamps will furnish bright illumination. When the contacts 2 and 3 are disconnected, current from the battery 6 finds access to the lamps through the dimming resistence 4 causing the lamps to furnish dim light. It is one object of my invention to provide improved mechanism, associated with the steering column, for placing the switch bar 5 in alternative adjustments.

The switching mechanism of which the bar 5 and the contacts 2 and 3 form parts is housed within a switch casing 8 which is secured upon the stationary steering column 9 by means of a bracket 10 which supports the switch casing and the mechanism therein upon the exterior and at one side of the column. The steering column is shown as being assembled with an instrument board 9' by a bracket 9². The switch casing has a closure disc 11 of insulating material which carries the metallic spring barrels 12 in which the contacts 2 and 3 are adapted to slide, these contacts being pressed into engagement with the contacting bar 5 or with the insulating disc 13 that carries this bar, according to the position to which the disc 13 is turned. The spring barrels are provided with reduced ends that extend through the closure disc 11, binding screws 14 serving to secure the wires that pertain to the contacts 2 and 3 in electrical connection with said spring barrels, current flowing through the spring barrels to said contacts when the bar 5 is in circuit closing position. A stub shaft 15 is journalled within the wall of the casing that is opposite the disc 11, this stub shaft carrying prongs 16 that are received within the disc 13 and serve to turn the disc into circuit opening or circuit closing position according to the position to which said stub shaft is turned. This stub shaft is formed with a lateral extension 17 received between the sides of one of the forked ends of a rocking lever 18 which is pivoted between its ends upon the switch casing. The structural characteristics thus far described are common to both forms of the invention illustrated. The structure shown in Figs. 1 to 5 inclusive will be further specifically described whereafter the structure shown in Figs. 7 and 8 will be further specifically described.

In the first structure the other forked end of the rocking lever 18 passes through a slot 19 in the steering column 9 to embrace a side of the ring 20 which surrounds and is slidable upon the hollow steering shaft 21 which is housed within the steering column 9, the shaft 21 being connected in any suitable well-known manner with the front steering vehicle wheels of an automobile or other travel guiding means supplied to the automotive vehicle. The steering shaft 21 is secured to the manually operated steering wheel 22 at the upper end of said shaft and by means of a key 23. By mechanism to be described the ring 20 is moved longitudinally of the shaft 21 to place the rocking lever 18 in either of its alternative adjustments, such movement of said ring being permitted when the shaft 21 is in any position to which it may be turned. Movement of the ring longitudinally of the shaft 21 is effected by means of a hollow rod 24 which is coaxial with the steering wheel and is connected at its lower end with the ring 20 through the intermediation of pins 25 which couple said rod with a ring 26 that is upon the interior of the shaft 21, ring 26 being coupled with ring 20 by means of pins 27 which are carried by the ring 20 and project inwardly into connection with the ring 26 and through slots 28 in the shaft 21, these slots being extended along said shaft sufficiently to permit movement of the ring 20 throughout the necessary range along said shaft. The rod 24 extends along the axis of the shaft 21, this rod being desirably coaxial with the shaft when being located therein. The upper end of said rod has a cam slot 29 extending through one side thereof, this cam slot receiving a pin 30 which is carried by the hub 31 of a switch controlling lever 32. Said hub is journalled within the upper end of the shaft 21. the switch lever 32 being upon the upper side of the steering wheel 22 where it may be readily reached for operation. The lever 32, which is thus adapted to turn upon an axis which is coincident with the common axis of the steering wheel 22, the steering shaft 24 and the stationary column 9, is confined to a single plane of movement as it is turned with respect to the wheel. When, therefore, this lever is turned, longitudinal movement of the hollow rod 24 is effected and if the lever is turned sufficiently, it will move said rod sufficiently to place the contacting bar 5 in either its circuit closing position or circuit opening position. The rod 24 is held from turning with respect to the steering shaft 21 by the pins 27 so that said rod is confined to a longitudinal movement with respect to said shaft although it is capable of turning with the shaft upon the common axis of the rod and shaft.

Another lever 33 is illustrated which is employed as a throttle lever to control the gaseous fuel which is supplied to the internal combustion engine. This lever has a hub portion 34 which is coupled with a sleeve 35 that surrounds and is journaled upon the rod 24 and also upon and within bearings, of which one is shown at 36, which is carried by the steering shaft 21 and within the bore of this shaft. The lever 33 has an arcuate shoulder 37 which is concentric with the shaft, rod and sleeve and which carries pins 38 that project over the axial portion of the lever 32 and engage this lever portion to prevent this lever from rising.

A horn button switch is illustrated upon the outer side of the wheel, this switch having a casing 39 which is secured to the portion 37 by the pins 38 that are preferably secured into position. A push button 40 extends through the casing 39 to be accessible from the top side of this casing, the bottom portion 41 being engageable with a contact spring 42 to press this contact against a complemental contact 43 for the purpose of closing the circuit of the horn. The contact 42 is grounded upon the lever 32 and the metallic parts in electrical connection therewith. The contact 43 is connected by the circuit wire 44 with the battery and horn.

In the structure illustrated in Figs. 1 to 4 inclusive, the switching mechanism that is remote from the steering wheel is positively operated by the lever 32 in each direction to a circuit opening position or a circuit closing position or, in other words, with reference to Fig. 6, to a position in which the shunt about the dimming resistance 4 is either opened or closed. In the structure shown in Figs. 7 and 8, the controlling rod 45 replaces the rod 24 and instead of being upon the interior of the steering shaft 21, is located between this steering shaft and the steering column in whose interior this rod 45 is also located. In the structure of Fig. 8, the switching mechanism is likewise remote from the steering wheel but the rocking lever 18 of this switching mechanism does not extend into the interior of the steering column. The forked end of this lever which is adjacent the steering column receives the head 46 of a bolt 47 which extends through a slot 48 in the steering column, this bolt having a flange 49 sliding upon the outer side of the steering column and being connected with a block 50 which slides between the steering column and the steering shaft. The rod 45 is fixed to the block 50 and extends upwardly through the bearing 51 disposed within the upper end of the steering column and in which the shaft 21 is journaled. A spring 52 is coupled, at one end, with an extension 53 of the stub shaft 15 and is anchored at its other end to the switch casing. This spring serves when free to function, to turn the contacting bar 5 to one of the alternative positions of this bar while the rod 45 functions through the block 50 and the rocking lever 18 to reverse the movement of said contacting bar. The upper end of the rod 45 is engageable with a cam formation 54 which is provided upon the hub 55 of a control lever 56, this lever hub being journalled upon the upper end of the steering column. The lever is confined to a fixed plane of rotation by reason of the interposition of a portion of its hub between the upper end of the steering column and the lower end of the hub of the steering wheel 22. The hub of the lever 56 is desirably split, as indicated at 57 to enable it to be held in suitably snug turning engagement with the steering column by means of a tightening screw 58. From the foregoing explanation it will be understood that when the lever 56 is turned in one direction upon and with respect to the steering column, the rod 45 will be depressed against the force of the spring 52 to place the contacting bar 5 in one position and that when said lever is reversed, the spring 52 will be free to place the bar 5 in its alternative position, the cam 54 assuming a position in which the spring is free to move the rod 45 upwardly.

The structure shown in Figs. 7 and 8 is also the subject matter of a division of this application, Serial Number 246,824, filed January 14, 1928.

Changes may be made without departing from the invention.

Having thus described my invention, I claim:

The combination with a rotatable hollow vehicle steering shaft having a steering wheel on one end thereof and a stationary tubular column housing said shaft; of a longitudinally movable rod within the shaft, a lever located adjacent to said steering wheel and mounted to rotate on the axis of said shaft, a cam connection between said lever and rod whereby oscillation of the lever will reciprocate the rod, an operating arm pivotally mounted adjacent said rod and having a recess in one end, a ring slidably mounted on said shaft and extending into said recess, and means connecting the ring to said rod.

In witness whereof, I hereunto subscribe my name.

HARRY A. DOUGLAS.